Patented Mar. 17, 1925.

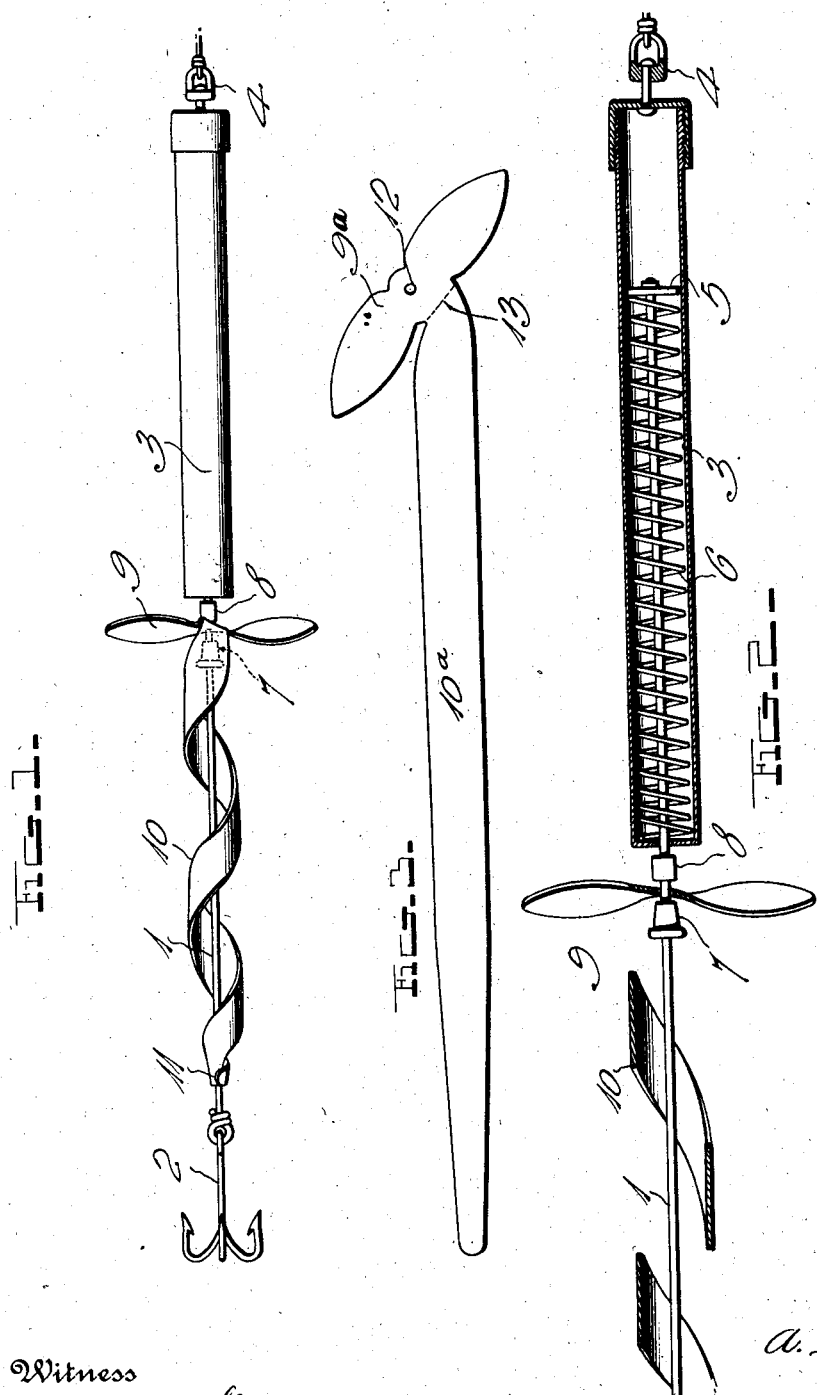

1,530,343

UNITED STATES PATENT OFFICE.

ALBERT BAYER, OF MILWAUKEE, WISCONSIN.

FISHING BAIT.

Application filed December 18, 1924. Serial No. 756,767.

*To all whom it may concern:*

Be it known that I, ALBERT BAYER, a citizen of the United States, residing at Milwaukee, in the county of Milwaukee and State of Wisconsin, have invented certain new and useful Improvements in Fishing Baits; and I do declare the following to be a full, clear, and exact description of the invention, such as will enable others skilled in the art to which it appertains to make and use the same.

My invention relates to improvements in fishing baits of the type in which a bait member is rotated as the device is drawn through the water, for instance, when trolling.

It is the object of the invention to provide a device of the class set forth, in which a unique form of bait is driven by a rotating spinner and is connected at one of its ends to a hook-carrying stem, by said spinner, the other end of the bait being provided with a bearing which is rotatable upon the hook-carrying end of said stem.

A further aim of the invention is to provide a unique construction, in which the bait and the spinner are formed from a single sheet metal blank.

With the foregoing in view, the invention resides in the novel subject matter hereinafter described and claimed, the description being supplemented by the accompanying drawing.

Figure 1 is a side elevation.

Figure 2 is a longitudinal sectional view through a portion of the device.

Figure 3 is a plan view of the blank from which the spinner and the bait are formed.

In the drawing above briefly described, the numeral 1 designates a straight shank which is preferably formed of a single length of wire, one end of said shank being adapted for connection with a fishing line, while its other end is provided with an appropriate hook or hooks 2. In the construction shown, the first named end of the stem 1, passes into a metallic tube 3, one end of said tube having a swivel 4 for connection to the fishing line, while its other end is merely formed with an opening through which the stem 1 passes slidably. Confined within the tube, between the last named end thereof and an appropriate abutment 5 on the stem 1, is a coiled compression spring 6 which establishes a yieldable connection between the stem and the tube, so that there is practically no danger of breaking the line when a fish jerks upon the hook, or if said hook should catch in any roots, débris or the like while trolling.

Freely rotatable upon the stem 1, between a pair of enlargements 7 and 8 thereon, is a water-rotated spinner 9, which is preferably provided with two, opposed, pitched blades. This spinner is near the line end of the stem 1, and extending from it to the hook-carrying end of said stem, is a helical bait 10, said bait being disposed around the stem 1 in outwardly spaced relation with the latter. The end of the bait 10, adjacent the hook 2, is rotatably connected with the stem 1, by a suitable bearing 11, this bearing being preferably formed by bending one end of the bait, as indicated in Fig. 1. The other end of the bait 10 is secured to the central portion of the spinner 9 and is by this spinner rotatably connected with the stem 1.

In the preferred manner of constructing the device, the bait 10 is formed from a single elongated metal strip which is indicated at 10ᵃ in Fig. 3, and the spinner is formed from an elongated head integral with one end of the strip and disposed obliquely thereof as indicated at 9ᵃ in Fig. 3. The strip and the head are stamped from a single piece of sheet metal, and the stamping operation may also form an opening 12 through the center of said head, to later receive the stem 1. Then, the strip and head are bent upon the line 13 (Fig. 3), the opposite ends of the head are slightly twisted to form the spinner blades, and the strip 10ᵃ is curved into helical form to provide the bait 10, the free end of said strip being bent to provide the bearing 11.

By providing the construction shown and described, a very simple and inexpensive, yet an efficient and desirable fishing bait is produced, and as excellent results are obtainable from the exact details disclosed, they may well be followed. However, within the scope of the invention as claimed, minor changes may be made.

I claim:—

A fishing bait comprising a stem adapted for connection with a line at one end and for carrying a hook at its other end, a water-operated spinner rotatably mounted on the line end of said stem, and an elongated helical bait surrounding and spaced outwardly from said stem, said bait having a bearing at one of its ends rotatably surrounding the hook-carrying end of the stem, the other end of said bait being secured to said spinner and being by the latter connected rotatably to the stem, said bait being formed of a single metal strip with one end bent to form said bearing, said spinner being formed from an elongated head integral with the other end of said strip and disposed obliquely to the latter.

In testimony whereof I have hereunto affixed my signature.

ALBERT BAYER.